(12) United States Patent
Apostolopoulos

(10) Patent No.: US 10,787,258 B2
(45) Date of Patent: Sep. 29, 2020

(54) PORTABLE UNMANNED AERIAL VEHICLE APPROACH AND DEPARTURE ZONE PROTECTION PLATFORM

(71) Applicant: The Boeing Company, Chicago, IL (US)

(72) Inventor: Athanasios Apostolopoulos, Castle Rock, CO (US)

(73) Assignee: The Boeing Company, Chicago, IL (US)

( * ) Notice: Subject to any disclaimer, the term of this patent is extended or adjusted under 35 U.S.C. 154(b) by 3 days.

(21) Appl. No.: 15/810,012

(22) Filed: Nov. 11, 2017

(65) Prior Publication Data

US 2019/0144111 A1    May 16, 2019

(51) Int. Cl.

| B64C 39/02 | (2006.01) |
|---|---|
| B64D 45/04 | (2006.01) |
| G08G 5/04 | (2006.01) |
| B64F 1/00 | (2006.01) |
| G01S 17/933 | (2020.01) |
| G08G 5/02 | (2006.01) |
| G08G 5/00 | (2006.01) |
| G01S 13/91 | (2006.01) |
| G01S 17/88 | (2006.01) |

(Continued)

(52) U.S. Cl.
CPC ............ *B64C 39/024* (2013.01); *B64F 1/007* (2013.01); *G01S 13/913* (2013.01); *G01S 17/88* (2013.01); *G01S 17/933* (2013.01); *G08G 5/0013* (2013.01); *G08G 5/0021* (2013.01); *G08G 5/0026* (2013.01); *G08G 5/0065* (2013.01); *G08G 5/025* (2013.01); *B64C 2201/18* (2013.01); *G01S 15/88* (2013.01); *G05D 1/0676* (2013.01); *G08G 5/003* (2013.01); *G08G 5/0069* (2013.01)

(58) Field of Classification Search
CPC ........ B64C 39/024; B64C 39/02; G05D 1/06; G05D 1/02; B64D 45/04; G06F 19/00; G01S 19/01; B64F 1/18; G08G 5/04; G01C 3/00
See application file for complete search history.

(56) References Cited

U.S. PATENT DOCUMENTS

| 7,945,356 B2 * | 5/2011 | Wilkins, Jr. ............ B64F 1/007 340/950 |
|---|---|---|
| 8,314,730 B1 | 11/2012 | Musaik et al. |
| 9,387,928 B1 | 7/2016 | Gentry et al. |

(Continued)

FOREIGN PATENT DOCUMENTS

CN          105197252 A  * 12/2015  ................ B64F 1/18

OTHER PUBLICATIONS

Netherlands Patent Office/Enterprise Agency Office Search Report, Written Opinion, and English translation, dated Aug. 31, 2018, regarding Application No. NL2020098, 11 pages.

(Continued)

*Primary Examiner* — Yuri Kan
(74) *Attorney, Agent, or Firm* — Yee & Associates, P.C.

(57) ABSTRACT

A portable unmanned aerial vehicle approach and departure zone protection platform comprises a base, an active monitoring sensor connected to the base, a processor connected to the base, and a communication device connected to the base. The processor is configured to determine whether an object is present within an approach funnel.

30 Claims, 11 Drawing Sheets

(51) Int. Cl.
　　　*G05D 1/06*　　　　(2006.01)
　　　*G01S 15/88*　　　(2006.01)

(56) References Cited

U.S. PATENT DOCUMENTS

| | | | |
|---|---|---|---|
| 9,429,953 B1* | 8/2016 | Miller | G05D 1/0676 |
| 2003/0001770 A1 | 1/2003 | Cornell et al. | |
| 2004/0101162 A1* | 5/2004 | Higaki | G06T 7/215 |
| | | | 382/103 |
| 2006/0155432 A1 | 7/2006 | Brown | |
| 2013/0282208 A1* | 10/2013 | Mendez-Rodriguez | |
| | | | G01S 17/89 |
| | | | 701/16 |
| 2014/0009313 A1* | 1/2014 | Tagato | G08G 5/045 |
| | | | 340/961 |
| 2014/0081569 A1 | 3/2014 | Agrawal et al. | |
| 2015/0323932 A1* | 11/2015 | Paduano | G06Q 10/08 |
| | | | 701/3 |
| 2015/0379408 A1 | 12/2015 | Kapoor et al. | |
| 2017/0308100 A1* | 10/2017 | Iskrev | G05D 1/0676 |

OTHER PUBLICATIONS

European Patent Office Communication and Extended Search Report, dated Apr. 8, 2019, regarding Application No. 18206047.5, 10 pages.

* cited by examiner

PORTABLE UNMANNED AERIAL VEHICLE APPROACH AND DEPARTURE ZONE PROTECTION PLATFORM

BACKGROUND INFORMATION

1. Field

The present disclosure relates generally to unmanned aerial vehicles and, more specifically, to controlled ascent and descent of unmanned aerial vehicles. Yet more specifically, the present disclosure relates to controlling ascent and descent of unmanned aerial vehicles based on nearby objects.

2. Background

First responders and emergency personnel may utilize unmanned aerial vehicles to monitor or assess emergency situations. During emergency situations, unmanned aerial vehicles may not have access to designated landing facilities. Unlike piloted aircraft, unmanned aerial vehicles may take off and land from temporary locations.

Temporary approach and departure locations may be established for unmanned aerial vehicles. However, depending on the location, objects may pass through the approach and departure locations. For example, people, animals, or even vehicles may pass through a temporary approach and departure location for an unmanned aerial vehicle.

It would be undesirable for an unmanned aerial vehicle to attempt to land while an object is at the approach location. It would also be undesirable for an unmanned aerial vehicle to attempt to take off when an object is in a projected flight path.

Therefore, it would be desirable to have a method and apparatus that take into account at least some of the issues discussed above, as well as other possible issues. For example, it would be desirable to provide a portable landing system for unmanned aerial vehicles.

SUMMARY

An illustrative embodiment of the present disclosure provides a portable unmanned aerial vehicle approach and departure zone protection platform comprising a base, an active monitoring sensor connected to the base, a processor connected to the base, and a communication device connected to the base. The processor is configured to determine whether an object is present within an approach funnel.

Another illustrative embodiment of the present disclosure provides a method. An approach funnel of a portable unmanned aerial vehicle approach and departure zone protection platform is monitored using an active monitoring sensor of the portable unmanned aerial vehicle approach and departure zone protection platform. Instructions for maneuvering an unmanned aerial vehicle are generated based on the monitoring. The instructions are sent to an unmanned aerial vehicle for controlling one of ascent or descent of the unmanned aerial vehicle.

A further illustrative embodiment of the present disclosure provides a method. Whether an object is present within an approach funnel for an unmanned aerial vehicle is determined based on measurements provided by an active monitoring sensor, to form a determination. Feedback is generated regarding placement of the portable unmanned aerial vehicle approach and departure zone protection platform in the environment based on the determination. The feedback is displayed to an operator.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
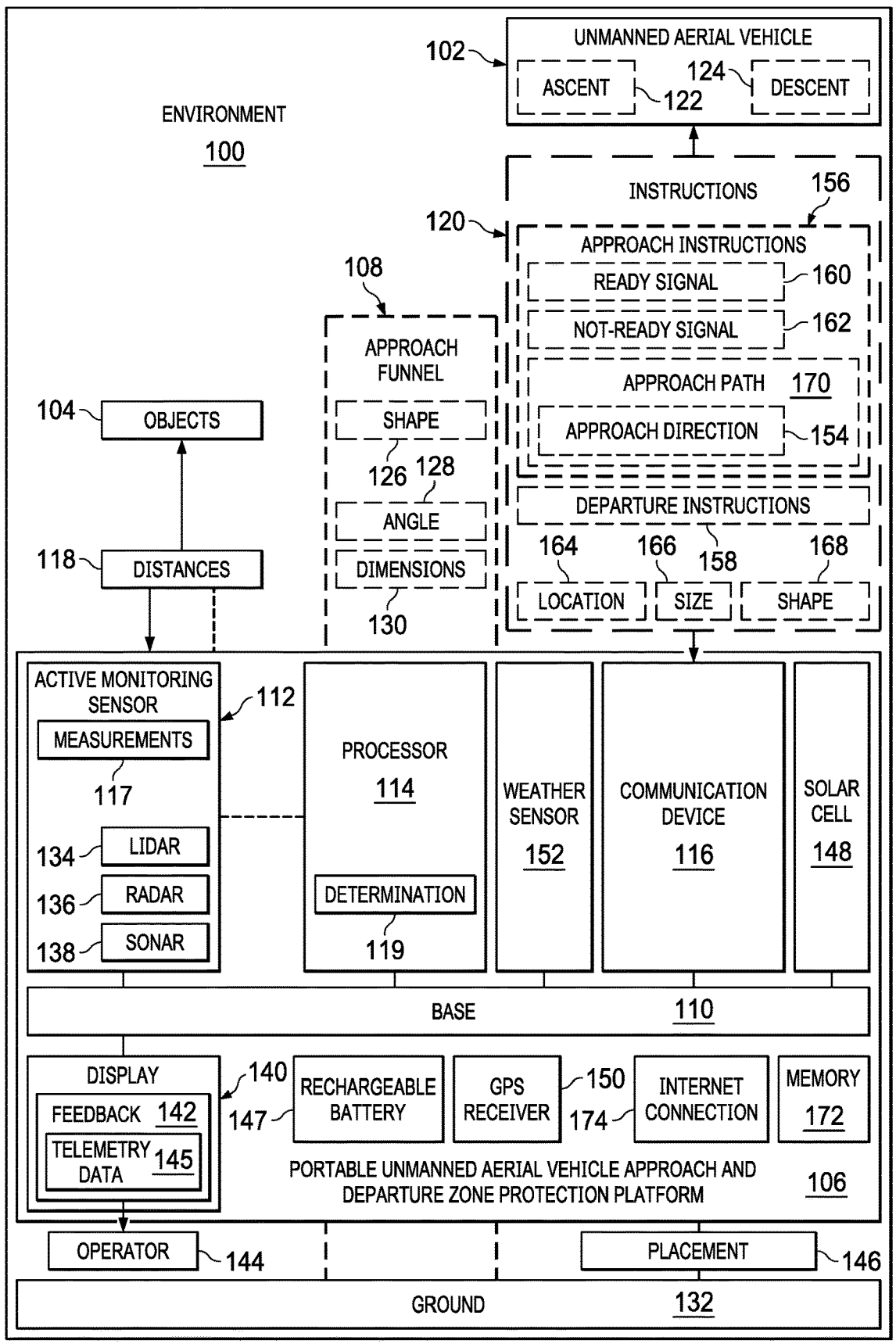
FIG. 1 is an illustration of a block diagram of an environment in which a portable unmanned aerial vehicle approach and departure zone protection platform is present in accordance with an illustrative embodiment.

The illustrative embodiments recognize and take into account one or more different considerations. For example, the illustrative embodiments recognize and take into account that unmanned aerial vehicles are advantageous in several scenarios. The illustrative embodiments recognize and take into account that unmanned aerial vehicles can be used for repetitive tasks with consistent results. The illustrative embodiments recognize and take into account that unmanned aerial vehicles may be less expensive to operate than conventional aircraft. The illustrative embodiments recognize and take into account that unmanned aerial vehicles may fly for longer periods of time than conventional aircraft. The illustrative embodiments recognize and take into account that unmanned aerial vehicles may perform tasks without risks to human pilots. The illustrative embodiments recognize and take into account that some unmanned aerial vehicles may maneuver in tight spaces and fly at lower altitudes than conventional aircraft.

The illustrative embodiments recognize and take into account that unmanned aerial vehicles may be used to inspect pipeline locations or track wildlife migrations in sparsely populated areas. The illustrative embodiments recognize and take into account that sparsely populated areas may not have designated landing facilities for unmanned aerial vehicles.

The illustrative embodiments recognize and take into account that unmanned aerial vehicles may be used to deliver cargo. The illustrative embodiments recognize and take into account that at least one of consumer goods, food, or human passengers may be delivered to residences using unmanned aerial vehicles. The illustrative embodiments recognize and take into account that transient obstacles may be prevalent in residential areas. The illustrative embodiments recognize and take into account that it is desirable to protect an approach funnel for unmanned aerial vehicles in residential areas.

The illustrative embodiments recognize and take into account that technological advances and reductions in the cost of technology has increased the prevalence of unmanned aerial vehicles. The illustrative embodiments recognize and take into account that support systems for unmanned aerial vehicles may not be as prevalent as the unmanned aerial vehicles themselves.

The illustrative embodiments recognize and take into account that currently, human decisions, such as "eyeballing" of what looks to be a safe landing area is often used to determine takeoff and landing locations for unmanned aerial vehicles. The illustrative embodiments recognize and take into account that currently, a majority of unmanned aerial vehicles at least one of takeoff or land in an area that is not dedicated to unmanned aerial vehicle operations. For example, a majority of unmanned aerial vehicles may not take off or land at dedicated landing locations. For example, a majority of unmanned aerial vehicles may at least one of takeoff or land at temporary locations.

The illustrative embodiments recognize and take into account that an area that is not dedicated to unmanned aerial vehicle operations does not have air traffic protections like those found at an airport or heliport. The illustrative embodiments recognize and take into account that an area that is not dedicated to unmanned aerial vehicle operations may not have ground protections like those found at an airport or heliport. The illustrative embodiments recognize and take into account that currently, humans perform manual monitoring for obstacles interfering with non-dedicated landing areas. The illustrative embodiments recognize and take into account that human monitoring or protection of non-dedicated landing or take off areas may be undesirable. For example, human monitoring may not be able to take into account all objects in range of an approach path of an unmanned aerial vehicle. As another example, human monitoring may not be able to communicate to an unmanned aerial vehicle in a desirable amount of time. As yet a further example, human monitoring may not be practical or possible in remote or rural areas.

The illustrative embodiments recognize and take into account that it would be desirable for an unmanned aerial vehicle to receive location-specific information for an efficient landing or takeoff. For example, the illustrative embodiments recognize and take into account that it would be desirable for an unmanned aerial vehicle to take into account location-specific surrounding objects or weather in an approach path or a departure path.

The illustrative embodiments present a portable unmanned aerial vehicle approach and departure zone protection platform. The portable unmanned aerial vehicle approach and departure zone protection platform is portable and configured to communicate with unmanned aerial vehicles for at least one of one of approach or departure of the unmanned aerial vehicle. The portable unmanned aerial vehicle approach and departure zone protection platform is configured to protect the approach and departure zone, otherwise referred to as a "funnel," or an "approach funnel."

Referring now to the figures and, in particular, with reference to FIG. 1, an illustration of a block diagram of an environment in which a portable unmanned aerial vehicle approach and departure zone protection platform is present is depicted in accordance with an illustrative embodiment. Environment 100 is an environment in which unmanned aerial vehicles, such as unmanned aerial vehicle 102, may operate. Environment 100 is any desirable type of environment. In some illustrative examples, environment 100 may be an urban environment. In other illustrative examples, environment 100 may be a rural environment.

Objects 104 are present in environment 100. Objects 104 may be any type of mobile or stationary objects. Objects 104 may be any of animals, vegetation, buildings, vehicles, or any other type of structure. For example, objects 104 may include people. In other examples, objects 104 may include birds. In yet other examples, objects 104 may include trees.

Unmanned aerial vehicle 102 may land or takeoff within environment 100. In some illustrative examples, objects 104 may interfere with unmanned aerial vehicle 102 landing or taking off in environment 100.

Portable unmanned aerial vehicle approach and departure zone protection platform 106 is present within environment 100. Portable unmanned aerial vehicle approach and departure zone protection platform 106 protects approach funnel 108 for unmanned aerial vehicle 102. Portable unmanned aerial vehicle approach and departure zone protection platform 106 protects at least one of objects 104 or unmanned aerial vehicle 102 within approach funnel 108.

In some illustrative examples, portable unmanned aerial vehicle approach and departure zone protection platform 106 is a reusable platform. In these illustrative examples, after removal from environment 100, portable unmanned aerial vehicle approach and departure zone protection platform 106 may be placed in another environment or in another location within environment 100.

In some illustrative examples, portable unmanned aerial vehicle approach and departure zone protection platform 106 is a permanent or semi-permanent platform. In these illustrative examples, portable unmanned aerial vehicle approach and departure zone protection platform 106 is formed of materials selected to withstand repeated use. In some illustrative examples, portable unmanned aerial vehicle approach and departure zone protection platform 106 is formed to enable replacement of components for repeated deployments of portable unmanned aerial vehicle approach and departure zone protection platform 106.

In some illustrative examples, portable unmanned aerial vehicle approach and departure zone protection platform 106 is a disposable platform. When portable unmanned aerial vehicle approach and departure zone protection platform 106 is a disposable platform, portable unmanned aerial vehicle approach and departure zone protection platform 106 is placed within environment 100 and left in environment 100 after use. When disposable, portable unmanned aerial vehicle approach and departure zone protection platform 106 is assembled with components selected to be at least one of cost-effective, biodegradable, light-weight, or having any other desirable temporary characteristics.

Portable unmanned aerial vehicle approach and departure zone protection platform 106 may be placed at any desirable location within environment 100. Portable unmanned aerial vehicle approach and departure zone protection platform 106 is configured to be picked up and moved within environment 100. Further, portable unmanned aerial vehicle approach and departure zone protection platform 106 is configured to be removed from environment 100 and placed into a different environment if desirable.

For example, when unmanned aerial vehicle 102 is used in emergency assessment by first responders, portable unmanned aerial vehicle approach and departure zone protection platform 106 and unmanned aerial vehicle 102 are used in an environment including the emergency situation. After resolution of the emergency situation, portable unmanned aerial vehicle approach and departure zone protection platform 106 and unmanned aerial vehicle 102 are removed from environment 100. Portable unmanned aerial vehicle approach and departure zone protection platform 106 and unmanned aerial vehicle 102 may then be used in another environment during a future emergency situation.

As another non-limiting example, portable unmanned aerial vehicle approach and departure zone protection platform 106 may be used to support unmanned aerial vehicle 102 in environment 100 for monitoring of migratory patterns. After conducting the monitoring, portable unmanned aerial vehicle approach and departure zone protection platform 106 may be moved to another environment and used to support unmanned aerial vehicle 102.

Although unmanned aerial vehicle 102 and portable unmanned aerial vehicle approach and departure zone protection platform 106 are depicted in environment 100, portable unmanned aerial vehicle approach and departure zone protection platform 106 is not limited to interacting with only unmanned aerial vehicle 102. Any desirable quantity or design of unmanned aerial vehicles may takeoff or land from portable unmanned aerial vehicle approach and departure zone protection platform 106. In some illustrative examples, portable unmanned aerial vehicle approach and departure zone protection platform 106 may limit the identity of unmanned aerial vehicles authorized to takeoff or land using portable unmanned aerial vehicle approach and departure zone protection platform 106. In other examples, portable unmanned aerial vehicle approach and departure zone protection platform 106 may be used by any unmanned aerial vehicles in environment 100.

Portable unmanned aerial vehicle approach and departure zone protection platform 106 comprises base 110, active monitoring sensor 112, processor 114, and communication device 116. Active monitoring sensor 112 is connected to base 110. Active monitoring sensor 112 is configured to detect distances 118 of objects 104 from portable unmanned aerial vehicle approach and departure zone protection platform 106. Processor 114 is connected to base 110. Processor 114 is configured to determine whether an object is present within approach funnel 108 for unmanned aerial vehicle 102 based on measurements 117 provided by active monitoring sensor 112. Processor 114 is configured to determine whether an object is present within approach funnel 108 for unmanned aerial vehicle 102 based on distances 118 of objects 104 provided by active monitoring sensor 112 to form determination 119 and further configured to generate instructions 120.

Approach funnel 108 of portable unmanned aerial vehicle approach and departure zone protection platform 106 is monitored using active monitoring sensor 112 of portable unmanned aerial vehicle approach and departure zone protection platform 106. In some illustrative examples, approach funnel 108 is continuously monitored using active monitoring sensor 112. When approach funnel 108 is continuously monitored, measurements 117 are taken at set time intervals. The time interval may be any desirable length. For example, measurements 117 may be taken at intervals less than a minute, a minute, or more than a minute.

In some illustrative examples, approach funnel 108 is monitored during descent of unmanned aerial vehicle 102. In some illustrative examples, when approach funnel 108 is monitored during descent of unmanned aerial vehicle 102, measurements 117 may be taken continuously. In some illustrative examples, when approach funnel 108 is monitored during descent of unmanned aerial vehicle 102, measurements 117 may be taken more frequently than during the operational continuous monitoring. During continuous monitoring, the intervals may be longer than intervals during descent of unmanned aerial vehicle 102. For example, during descent of unmanned aerial vehicle 102, measurements 117 may be taken every second while measurements are taken every two seconds, five seconds, or longer intervals during the operational continuous monitoring.

In some illustrative examples, monitoring approach funnel 108 using active monitoring sensor 112 occurs prior to ascent of unmanned aerial vehicle 102 from the portable unmanned aerial vehicle approach and departure zone protection platform 106. In some illustrative examples, monitoring approach funnel 108 using active monitoring sensor 112 occurs in response to receiving a request for unmanned aerial vehicle 102 to land using approach funnel 108.

Communication device 116 is connected to base 110. Communication device 116 is configured to send instructions 120 to unmanned aerial vehicle 102. Unmanned aerial vehicle 102 takes instructions 120 into account when controlling one of ascent 122 or descent 124 of unmanned aerial vehicle 102. By taking into account instructions 120 when controlling one of ascent 122 or descent 124 of unmanned aerial vehicle 102, unmanned aerial vehicle 102 is controlled based on determination 119 by processor 114 whether an object is present within approach funnel 108.

Approach funnel 108 has shape 126, angle 128, and dimensions 130. Shape 126 may be any desirable shape. In some illustrative examples, shape 126 is conical. In some illustrative examples, shape 126 is partially conical.

Angle 128 is an angle of approach funnel 108 relative to base 110. When base 110 is positioned on ground 132, angle 128 may be measured relative to ground 132. In some illustrative examples, when base 110 is positioned on ground 132, approach funnel 108 includes portions of ground 132. Angle 128 may be measured from a centerline of approach funnel 108.

Approach funnel 108 has dimensions 130. Dimensions 130 include any desirable dimensions of approach funnel 108. For example, dimensions 130 include at least one of width or height.

In some illustrative examples, approach funnel 108 may be set by a user. In some illustrative examples, approach funnel 108 may be established based on objects 104 in environment 100. In some illustrative examples, approach funnel 108 is changed based on objects 104 in environment 100.

Active monitoring sensor 112 detects distances 118 of objects 104 in environment 100. In some illustrative examples, active monitoring sensor 112 is at least one of LIDAR 134, RADAR 136, or SONAR 138.

Processor 114 uses readings from active monitoring sensor 112 to make determination 119. Together, active monitoring sensor 112 and processor 114 actively monitor for any objects that enter approach funnel 108.

In some illustrative examples, portable unmanned aerial vehicle approach and departure zone protection platform 106 includes display 140 configured to provide feedback 142 to operator 144 regarding placement 146 of portable unmanned aerial vehicle approach and departure zone protection platform 106 in environment 100. Feedback 142 to operator 144 may be regarding placement 146 relative to objects 104 in environment 100. Feedback 142 to operator 144 may be regarding dimensions 130 or shape 126 of approach funnel 108 based on placement 146 of portable unmanned aerial vehicle approach and departure zone protection platform 106 within environment 100.

In some illustrative examples, feedback 142 to operator 144 includes telemetry data 145 of objects 104 generated by active monitoring sensor 112. In some illustrative examples, feedback 142 to operator 144 includes telemetry data of objects 104 that may penetrate approach funnel 108. Feedback 142 will help operator 144 to identify obstacles that could be potentially be removed to accommodate certain paths (not depicted) for approach funnel 108. For example, cutting tree branches or trees may remove potential obstacles from approach funnel 108. Feedback 142 is helpful if approach funnel 108 needs to meet certain regulatory requirements for size and obstacle protected areas.

Although display 140 is depicted as a component of portable unmanned aerial vehicle approach and departure zone protection platform 106, in other illustrative examples, display 140 may be part of a different apparatus in environment 100. For example, display 140 may be a portion of a handheld electronic device used by operator 144.

In some illustrative examples, processor 114 is configured to change at least one of shape 126 of approach funnel 108, angle 128 of approach funnel 108, or a dimension of dimensions 130 of approach funnel 108 based on determining a number of objects is within approach funnel 108. In one illustrative example, processor 114 changes approach funnel 108 when an object encroaches upon approach funnel 108. In some illustrative examples, processor 114 makes approach funnel 108 smaller such that no objects are present within approach funnel 108.

In some illustrative examples, portable unmanned aerial vehicle approach and departure zone protection platform 106 includes rechargeable battery 147 and solar cell 148. In these illustrative examples, rechargeable battery 147 is used to power processor 114 and active monitoring sensor 112. In these illustrative examples, solar cell 148 is used to recharge rechargeable battery 147. When solar cell 148 is present, environment 100 may be a remote or rural environment. When solar cell 148 is present, portable unmanned aerial vehicle approach and departure zone protection platform 106 may be used in environment 100 without utilities.

As depicted, portable unmanned aerial vehicle approach and departure zone protection platform 106 includes GPS receiver 150. GPS receiver 150 is used to determine geographic coordinates of placement 146 of portable unmanned aerial vehicle approach and departure zone protection platform 106 within environment 100. Geographic coordinates of placement 146 of portable unmanned aerial vehicle approach and departure zone protection platform 106 may be part of instructions 120. For example, instructions 120 may include location 164 of approach funnel 108 in environment 100 including placement 146 of portable unmanned aerial vehicle approach and departure zone protection platform 106.

Instructions 120 include any desirable information for unmanned aerial vehicle 102 to take into account when controlling one of ascent 122 or descent 124. In some illustrative examples, instructions 120 include a slope of approach funnel 108 from a given point on portable unmanned aerial vehicle approach and departure zone protection platform 106.

In some illustrative examples, instructions 120 include a GPS elevation of portable unmanned aerial vehicle approach and departure zone protection platform 106. The GPS elevation may be obtained using GPS receiver 150 of portable unmanned aerial vehicle approach and departure zone protection platform 106.

In some illustrative examples, portable unmanned aerial vehicle approach and departure zone protection platform 106 includes weather sensor 152. Weather sensor 152 collects weather information. Weather sensor 152 may collect at least one of wind information, temperature readings, precipitation readings, or cloud cover readings.

In some illustrative examples, instructions 120 include weather information gathered from weather sensor 152. In some illustrative examples, instructions 120 include approach direction 154 based on weather information gathered from weather sensor 152.

In some illustrative examples, instructions 120 are approach instructions 156. In other illustrative examples, instructions 120 are departure instructions 158. Approach instructions 156 are for descent 124 of unmanned aerial vehicle 102. Approach instructions 156 are instructions for landing unmanned aerial vehicle 102 using approach funnel 108.

Departure instructions 158 are for ascent 122 of unmanned aerial vehicle 102. Departure instructions 158 are instructions for unmanned aerial vehicle 102 to takeoff using approach funnel 108.

Approach instructions 156 include at least one of ready signal 160 or not-ready signal 162. In some illustrative examples, not-ready signal 162 is sent when an object is present within approach funnel 108. In some illustrative examples, not-ready signal 162 is sent when an object is within a predetermined distance from portable unmanned aerial vehicle approach and departure zone protection platform 106. In some illustrative examples, not-ready signal 162 is sent when an object is within a predetermined distance from approach funnel 108.

Not-ready signal 162 may trigger any desirable behavior of unmanned aerial vehicle 102. In some illustrative examples, not-ready signal 162 requests unmanned aerial vehicle 102 circle or go-around. In some illustrative examples, not-ready signal 162 requests unmanned aerial vehicle 102 pass by portable unmanned aerial vehicle approach and departure zone protection platform 106 to find another approach funnel.

In some illustrative examples, approach instructions 156 further include location 164, size 166, and shape 168 for approach funnel 108. Location 164 takes into account readings from GPS receiver 150. Size 166 takes into account dimensions 130 of approach funnel 108. Shape 168 takes into account shape 126 and angle 128 of approach funnel 108.

In some illustrative examples, instructions 120 include approach direction 154 based on distances 118 of objects 104 detected by active monitoring sensor 112 from portable unmanned aerial vehicle approach and departure zone protection platform 106. In some illustrative examples, approach direction 154 is part of approach path 170. Approach path 170 may also include at least one of a starting point, an ending point, or turn by turn instructions.

In some illustrative examples, portable unmanned aerial vehicle approach and departure zone protection platform 106 also includes memory 172. Memory 172 may be used to store historical information regarding unmanned aerial vehicles communicating with portable unmanned aerial vehicle approach and departure zone protection platform 106. For example, memory 172 may store historical information regarding landings at portable unmanned aerial vehicle approach and departure zone protection platform 106, take offs at portable unmanned aerial vehicle approach and departure zone protection platform 106, instructions sent by portable unmanned aerial vehicle approach and departure zone protection platform 106, or any other desirable historical information. Using memory 172, portable unmanned aerial vehicle approach and departure zone protection platform 106 can retain metrics on traffic and weather data that can be used by interested parties for analytics.

In some illustrative examples, portable unmanned aerial vehicle approach and departure zone protection platform 106 also includes internet connection 174. Using internet connection 174, portable unmanned aerial vehicle approach and departure zone protection platform 106 can participate in unmanned aerial vehicle (UAV) Traffic Management. Using internet connection 174, portable unmanned aerial vehicle approach and departure zone protection platform 106 can provide communication to delivery companies, vendors, or other operators of unmanned aerial vehicles within environment 100.

Using internet connection 174, portable unmanned aerial vehicle approach and departure zone protection platform 106 can provide or receive weather information. In some illustrative examples, portable unmanned aerial vehicle approach and departure zone protection platform 106 provides the weather information to unmanned aerial vehicle 102.

In some illustrative examples, the portable unmanned aerial vehicle approach and departure zone protection platform 106 requires an authorization code from unmanned aerial vehicle 102. In some illustrative examples, the portable unmanned aerial vehicle approach and departure zone protection platform 106 requires an authorization code from unmanned aerial vehicle 102 prior to descent 124 of unmanned aerial vehicle 102. When portable unmanned aerial vehicle approach and departure zone protection platform 106 requires an authorization code prior to descent 124, portable unmanned aerial vehicle approach and departure zone protection platform 106 controls the traffic to portable unmanned aerial vehicle approach and departure zone protection platform 106.

For example, portable unmanned aerial vehicle approach and departure zone protection platform 106 may limit unmanned aerial vehicles authorized to land to only unmanned aerial vehicles controlled by a specific operator. In another example, portable unmanned aerial vehicle approach and departure zone protection platform 106 may limit unmanned aerial vehicles authorized to land to only unmanned aerial vehicles having specific sizes or designs.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The illustration of environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 2:
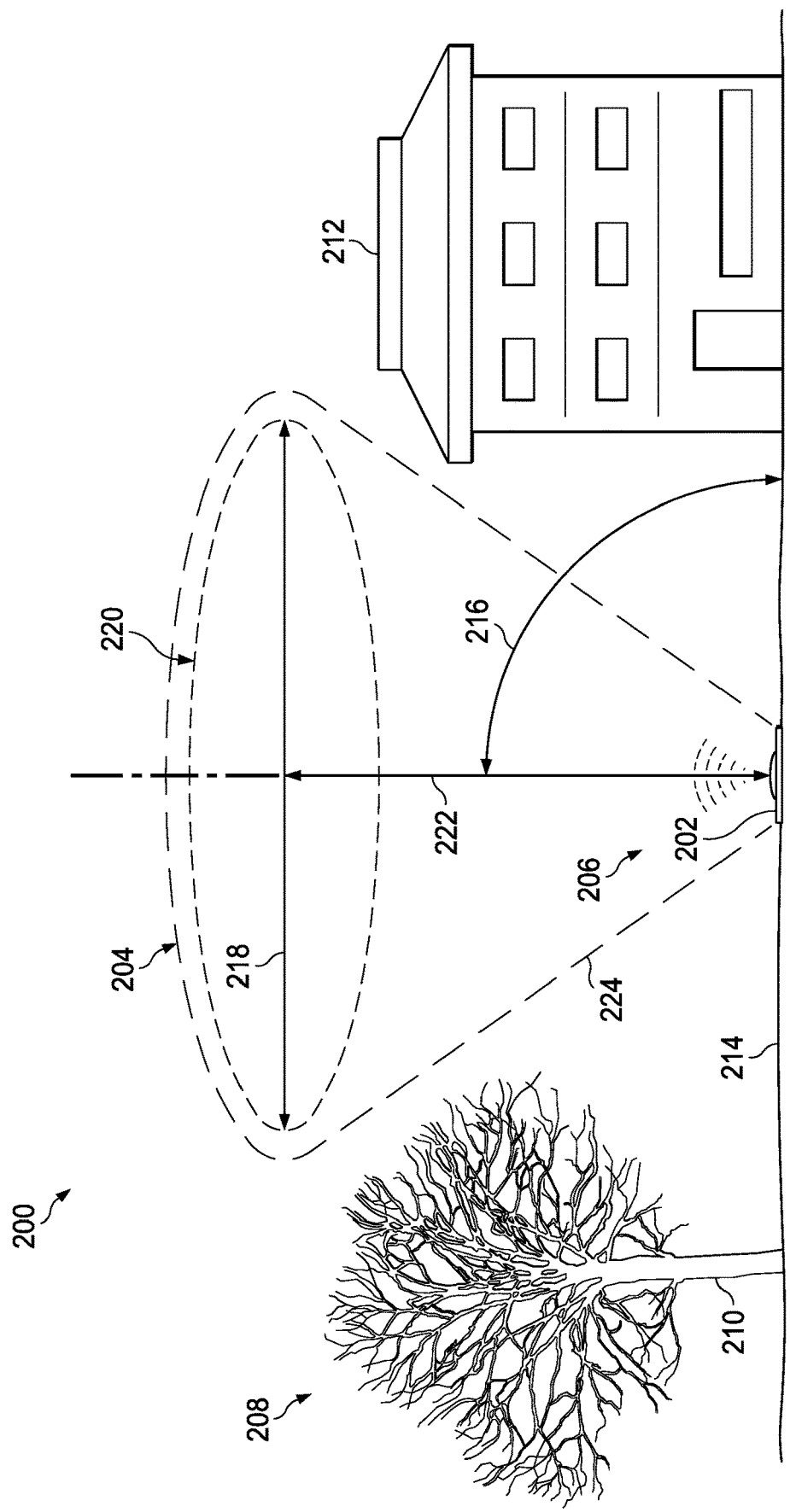
FIG. 2 is an illustration of an environment in which a portable unmanned aerial vehicle approach and departure zone protection platform is present in accordance with an illustrative embodiment.

Turning now to FIG. 2, an illustration of an environment in which a portable unmanned aerial vehicle approach and departure zone protection platform is present is depicted in accordance with an illustrative embodiment. Environment 200 is a physical implementation of environment 100 of FIG. 1.

Portable unmanned aerial vehicle approach and departure zone protection platform 202 is present in environment 200. Portable unmanned aerial vehicle approach and departure zone protection platform 202 is a physical implementation of portable unmanned aerial vehicle approach and departure zone protection platform 106 of FIG. 1.

Portable unmanned aerial vehicle approach and departure zone protection platform 202 protects approach funnel 204 for unmanned aerial vehicles. As depicted, no objects are present in approach funnel 204. Portable unmanned aerial vehicle approach and departure zone protection platform 202 protects an unmanned aerial vehicle (not depicted) from contacting objects during ascent or descent.

In some illustrative examples, an operator (not depicted) has placed portable unmanned aerial vehicle approach and departure zone protection platform 202 within environment 200. As depicted, placement 206 of portable unmanned aerial vehicle approach and departure zone protection platform 202 is between objects 208. Objects 208 include tree 210 and building 212. As depicted, placement 206 of portable unmanned aerial vehicle approach and departure zone protection platform 202 is on ground 214. By positioning portable unmanned aerial vehicle approach and departure zone protection platform 202 midway between tree 210 and building 212, approach funnel 204 is symmetrical. By positioning portable unmanned aerial vehicle approach and departure zone protection platform 202 midway between tree 210 and building 212, approach funnel 204 has a desirable size and shape.

By positioning portable unmanned aerial vehicle approach and departure zone protection platform 202 on ground 214, approach funnel 204 includes a portion of ground 214. As depicted, angle 216 of approach funnel 204 is approximately 90 degrees relative to ground 214. Depending on at least one of the type of unmanned aerial vehicle to use approach funnel 204, placement 206 of portable unmanned aerial vehicle approach and departure zone protection platform 202, or locations of objects 208, angle 216 may be changed. For example, angle 216 of approach funnel 204 for fixed wing unmanned aerial vehicles may have a different angle than angle 216. In some illustrative examples, width 218 is sufficient such that a fixed wing unmanned aerial vehicle may ascend and descend within approach funnel 204 with angle 216.

As depicted, approach funnel 204 is conical 220. As approach funnel 204 is conical 220, width 218 may instead be referred to as a diameter. Width 218 and height 222 of approach funnel 204 create slope 224 of approach funnel 204.

Dimensions for approach funnel 204 include width 218, height 222, and slope 224. At least one of angle 216, width 218, height 222, or slope 224 may be changed based on placement 206. At least one of angle 216, width 218, height 222, or slope 224 may be changed based on distances of objects 208 from portable unmanned aerial vehicle approach and departure zone protection platform 202. At least one of angle 216, width 218, height 222, or slope 224 may be changed if an object is determined to be within approach funnel 204. For example, width 218 may be changed if an object is determined to be on a periphery of approach funnel 204. As another example, angle 216 may be changed to remove a stationary object from approach funnel 204. As yet another example, a shape of approach funnel 204 may be changed to remove an object from approach funnel 204. For example, approach funnel 204 may be changed such that approach funnel 204 is not conical 220.

Portable unmanned aerial vehicle approach and departure zone protection platform 202 may be placed on ground 214 by any desirable method. In some illustrative examples, an operator (not depicted) places portable unmanned aerial vehicle approach and departure zone protection platform 202 such that portable unmanned aerial vehicle approach and departure zone protection platform 202 has placement 206 within environment 200. In some illustrative examples, a vehicle (not depicted) places portable unmanned aerial vehicle approach and departure zone protection platform 202 such that portable unmanned aerial vehicle approach and departure zone protection platform 202 has placement 206 within environment 200. For example, a wheeled vehicle may place portable unmanned aerial vehicle approach and departure zone protection platform 202 within environment 200 as the vehicle drives through environment 200. The wheeled vehicle (not depicted) may stop to place portable unmanned aerial vehicle approach and departure zone protection platform 202 within environment 200.

In another example, an unmanned aerial vehicle (not depicted) may place portable unmanned aerial vehicle approach and departure zone protection platform 202 within environment 200. In one example, the unmanned aerial vehicle may have its own proximity sensors to control placement 206 of portable unmanned aerial vehicle approach and departure zone protection platform 202 within environment 200. In another example, the unmanned aerial vehicle may use at least one sensor of portable unmanned aerial vehicle approach and departure zone protection platform 202 to control placement 206 of portable unmanned aerial vehicle approach and departure zone protection platform 202 within environment 200.

In some illustrative examples, an unmanned aerial vehicle may land to place portable unmanned aerial vehicle approach and departure zone protection platform 202 in environment 200. In other illustrative examples, an unmanned aerial vehicle may lower portable unmanned aerial vehicle approach and departure zone protection platform 202 using a tether or other suitable lowering system to place portable unmanned aerial vehicle approach and departure zone protection platform 202 within environment 200. In other illustrative examples, portable unmanned aerial vehicle approach and departure zone protection platform 202 could be dropped in a controlled fashion within environment 200. For example, unmanned aerial vehicle approach and departure zone protection platform 202 could be dropped using a parachute to facilitate landing in an orientation which allows for proper operation within environment 200.

The illustration of environment 200 in FIG. 2 is not meant to imply physical or architectural limitations to the manner in which an illustrative embodiment may be implemented. As noted, approach funnel 204 may have any desirable angle, any desirable dimensions, and any desirable shape. Additionally, any types of objects, stationary or mobile, may be present in environment 200.

Yet further, although portable unmanned aerial vehicle approach and departure zone protection platform 202 is depicted as having placement 206, in other illustrative examples, portable unmanned aerial vehicle approach and departure zone protection platform 202 may not be on ground 214. For example, portable unmanned aerial vehicle approach and departure zone protection platform 202 may be positioned on a vehicle or a structure on ground 214. For example, portable unmanned aerial vehicle approach and departure zone protection platform 202 may be placed on a building, such as building 212. In these illustrative examples, at least one of dimensions, angle 216, or shape of approach funnel 204 may change based on portable unmanned aerial vehicle approach and departure zone protection platform 202 being positioned on a building.

As another example, portable unmanned aerial vehicle approach and departure zone protection platform 202 may be placed on a truck, a boat, or any other desirable type of vehicle. In this example, approach funnel 204 may change at least one of dimensions, angle 216, or shape based on a position of the vehicle holding portable unmanned aerial vehicle approach and departure zone protection platform 202. If the vehicle moves, at least one of dimensions, angle 216, or shape of approach funnel 204 may change based on changing the position of the vehicle holding portable unmanned aerial vehicle approach and departure zone protection platform 202 within environment 200.

Although not visible in FIG. 2, portable unmanned aerial vehicle approach and departure zone protection platform 202 may have a solar panel (not depicted). The solar panel is used to charge a rechargeable battery of portable unmanned aerial vehicle approach and departure zone protection platform 202. The rechargeable battery is used to power at least one of a processor or active monitoring sensor of portable unmanned aerial vehicle approach and departure zone protection platform 202.

The solar cell may generate power for portions of portable unmanned aerial vehicle approach and departure zone protection platform 202 in environment 200 without connections to utilities. With a solar cell, portable unmanned aerial vehicle approach and departure zone protection platform 202 may operate in environment 200 without external connections to electricity.

In some illustrative examples, the solar cell may generate power to be shared with an unmanned aerial vehicle (not depicted). For example, after landing on or near portable unmanned aerial vehicle approach and departure zone protection platform 202, an unmanned aerial vehicle (not depicted) may be recharged using power generated by the solar cell.

Figure 3:
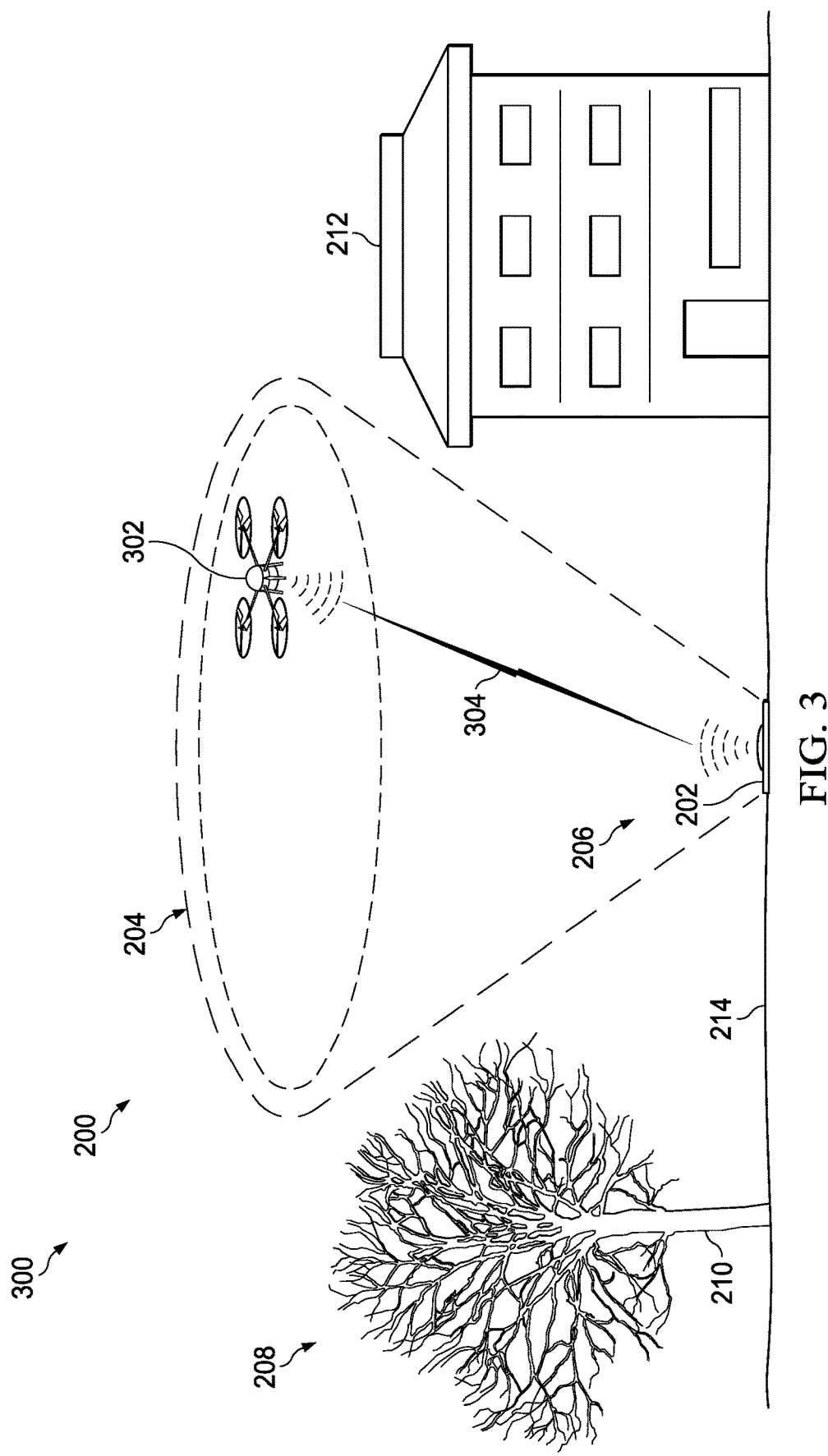
FIG. 3 is an illustration of an environment in which an unmanned aerial vehicle is approaching a portable unmanned aerial vehicle approach and departure zone protection platform in accordance with an illustrative embodiment.

Turning now to FIG. 3, an illustration of an environment in which an unmanned aerial vehicle is approaching a portable unmanned aerial vehicle approach and departure zone protection platform is depicted in accordance with an illustrative embodiment. View 300 is a view of unmanned aerial vehicle 302 approaching approach funnel 204 of portable unmanned aerial vehicle approach and departure zone protection platform 202.

Prior to landing on portable unmanned aerial vehicle approach and departure zone protection platform 202, unmanned aerial vehicle 302 requests to land. Portable unmanned aerial vehicle approach and departure zone protection platform 202 sends approach instructions 304 to unmanned aerial vehicle 302. In some illustrative examples, approach instructions 304 include instructions for controlling descent of unmanned aerial vehicle 302. In some illustrative examples, approach instructions 304 include a desirable approach path. In some illustrative examples, approach instructions 304 include a location, a size, and a shape of approach funnel 204.

In some illustrative examples, approach instructions 304 includes a ready signal. The ready signal indicates that a determination has been made that no objects are present in approach funnel 204.

Portable unmanned aerial vehicle approach and departure zone protection platform 202 actively monitors approach funnel 204. To actively monitor approach funnel 204, an active monitor sensor of portable unmanned aerial vehicle approach and departure zone protection platform 202 detects distances of objects from portable unmanned aerial vehicle approach and departure zone protection platform 202. For example, an active monitor sensor of portable unmanned aerial vehicle approach and departure zone protection platform 202 detects distances of objects 208 or any transient objects (not depicted) in environment 200 from portable unmanned aerial vehicle approach and departure zone protection platform 202. To actively monitor approach funnel 204, a processor of portable unmanned aerial vehicle approach and departure zone protection platform 202 determines if an object is present in approach funnel 204.

In some illustrative examples, portable unmanned aerial vehicle approach and departure zone protection platform 202 continuously actively monitors approach funnel 204. In these illustrative examples, portable unmanned aerial vehicle approach and departure zone protection platform 202 actively monitors approach funnel 204 even when an unmanned aerial vehicle is not present.

In some illustrative examples, distances of objects 208 from portable unmanned aerial vehicle approach and departure zone protection platform 202 are detected using an active monitoring sensor in response to receiving a request for unmanned aerial vehicle 302 to land using approach funnel 204. In these illustrative examples, portable unmanned aerial vehicle approach and departure zone protection platform 202 actively monitors approach funnel 204 in response to unmanned aerial vehicle 302 requesting to land using approach funnel 204.

In some illustrative examples, detecting distances of objects 208 from portable unmanned aerial vehicle approach and departure zone protection platform 202 using an active monitoring sensor occurs during descent of unmanned aerial vehicle 302. In these illustrative examples, portable unmanned aerial vehicle approach and departure zone protection platform 202 actively monitors approach funnel 204 as unmanned aerial vehicle 302 descends in approach funnel 204.

In these illustrative examples, if an object enters approach funnel 204 as unmanned aerial vehicle 302 descends, a communication device of portable unmanned aerial vehicle approach and departure zone protection platform 202 alerts unmanned aerial vehicle 302. For example, if an object enters approach funnel 204 as unmanned aerial vehicle 302 descends, the communication device may send a not-ready signal. After receiving a not-ready signal, unmanned aerial vehicle 302 stops descent. Unmanned aerial vehicle 302 may maintain its position in response to receiving the not-ready signal. Unmanned aerial vehicle 302 may circle until receiving a ready signal.

Figure 4:
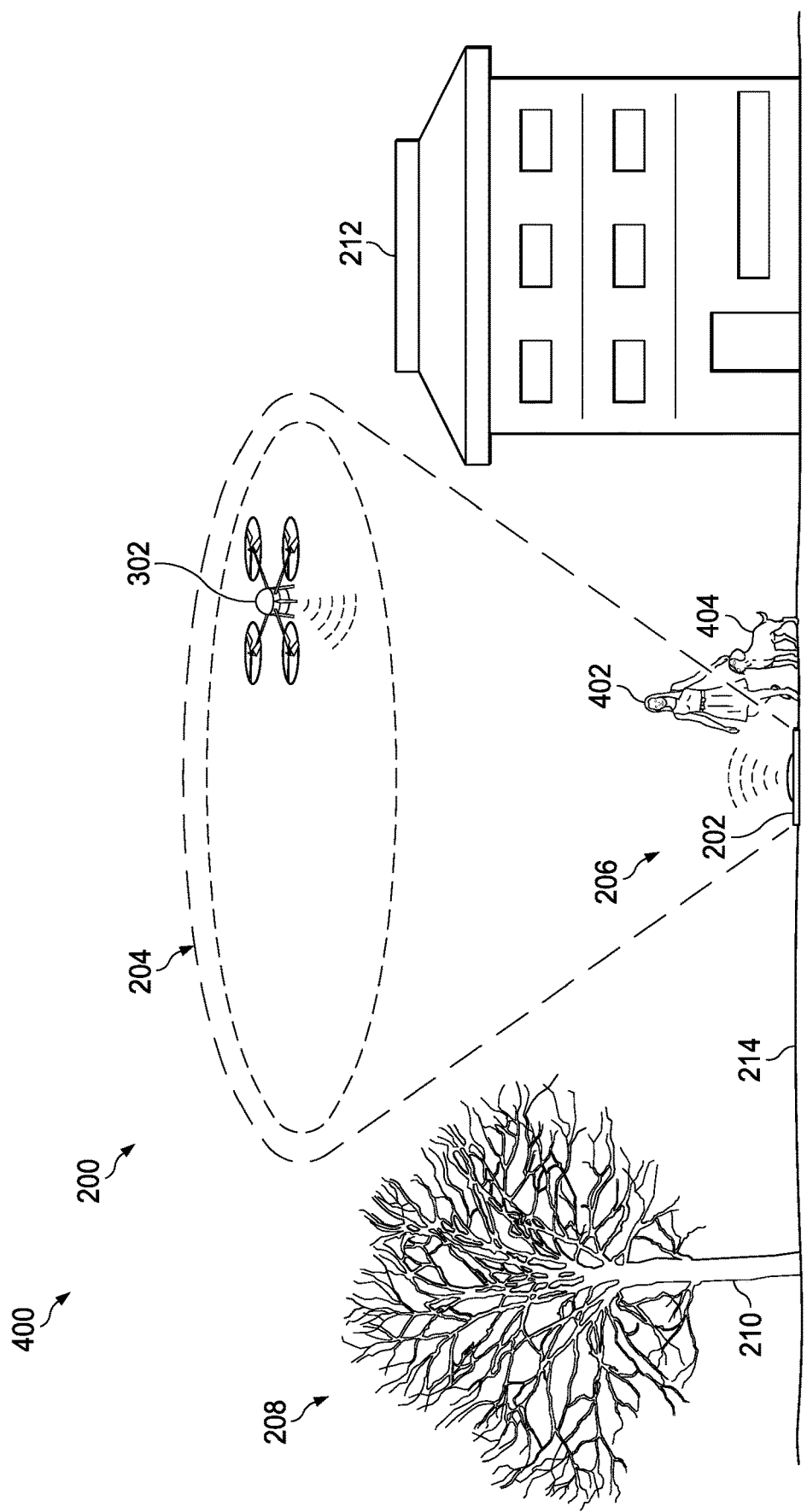
FIG. 4 is an illustration of an environment in which a person is present in an approach funnel of a portable unmanned aerial vehicle approach and departure zone protection platform in accordance with an illustrative embodiment.

Turning now to FIG. 4, an illustration of an environment in which a person is present in an approach funnel of a portable unmanned aerial vehicle approach and departure zone protection platform is depicted in accordance with an illustrative embodiment. View 400 is a view of person 402 and dog 404 walking across portable unmanned aerial vehicle approach and departure zone protection platform 202. As depicted, person 402 and dog 404 are present in approach funnel 204.

Portable unmanned aerial vehicle approach and departure zone protection platform 202 detects a distance of person 402 and dog 404 from portable unmanned aerial vehicle approach and departure zone protection platform 202. A processor of portable unmanned aerial vehicle approach and departure zone protection platform 202 determines that person 402 and dog 404 are present in approach funnel 204. After the processor makes the determination that person 402 and dog 404 are present in approach funnel 204, a communications device sends a not-ready signal to unmanned aerial vehicle 302.

In some illustrative examples, it is undesirable for an object to be within a predetermined distance of approach funnel 204. In these illustrative examples, the processor makes the determination that person 402 and dog 404 are within the predetermined distance from approach funnel 204, although not within approach funnel 204. In these illustrative examples, a communications device sends a not-ready signal to unmanned aerial vehicle 302.

As person 402 and dog 404 move within environment 200, an active monitoring sensor of portable unmanned aerial vehicle approach and departure zone protection platform 202 detects the distance of each of person 402 and dog 404 from portable unmanned aerial vehicle approach and departure zone protection platform 202. Once the processor determines person 402 and dog 404 are an acceptable distance away from portable unmanned aerial vehicle approach and departure zone protection platform 202, the communications device may send a ready signal to unmanned aerial vehicle 302.

In some illustrative examples, an acceptable distance is when person 402 and dog 404 are outside of approach funnel 204. In some illustrative examples, an acceptable distance is when person 402 and dog 404 are outside a predetermined distance from approach funnel 204.

In some illustrative examples, the processor of portable unmanned aerial vehicle approach and departure zone protection platform 202 detects a distance of person 402 and dog 404 prior to person 402 and dog 404 entering approach funnel 204. In these illustrative examples, the processor may project a future path for person 402 and dog 404. The processor projects the future path based on multiple distance measurements. The processor determines if the future path enters approach funnel 204 to form a second determination. In some illustrative examples, instructions are based on the second determination. In these illustrative examples, portable unmanned aerial vehicle approach and departure zone protection platform 202 may send a not-ready signal prior to person 402 and dog 404 entering approach funnel 204.

Figure 5:
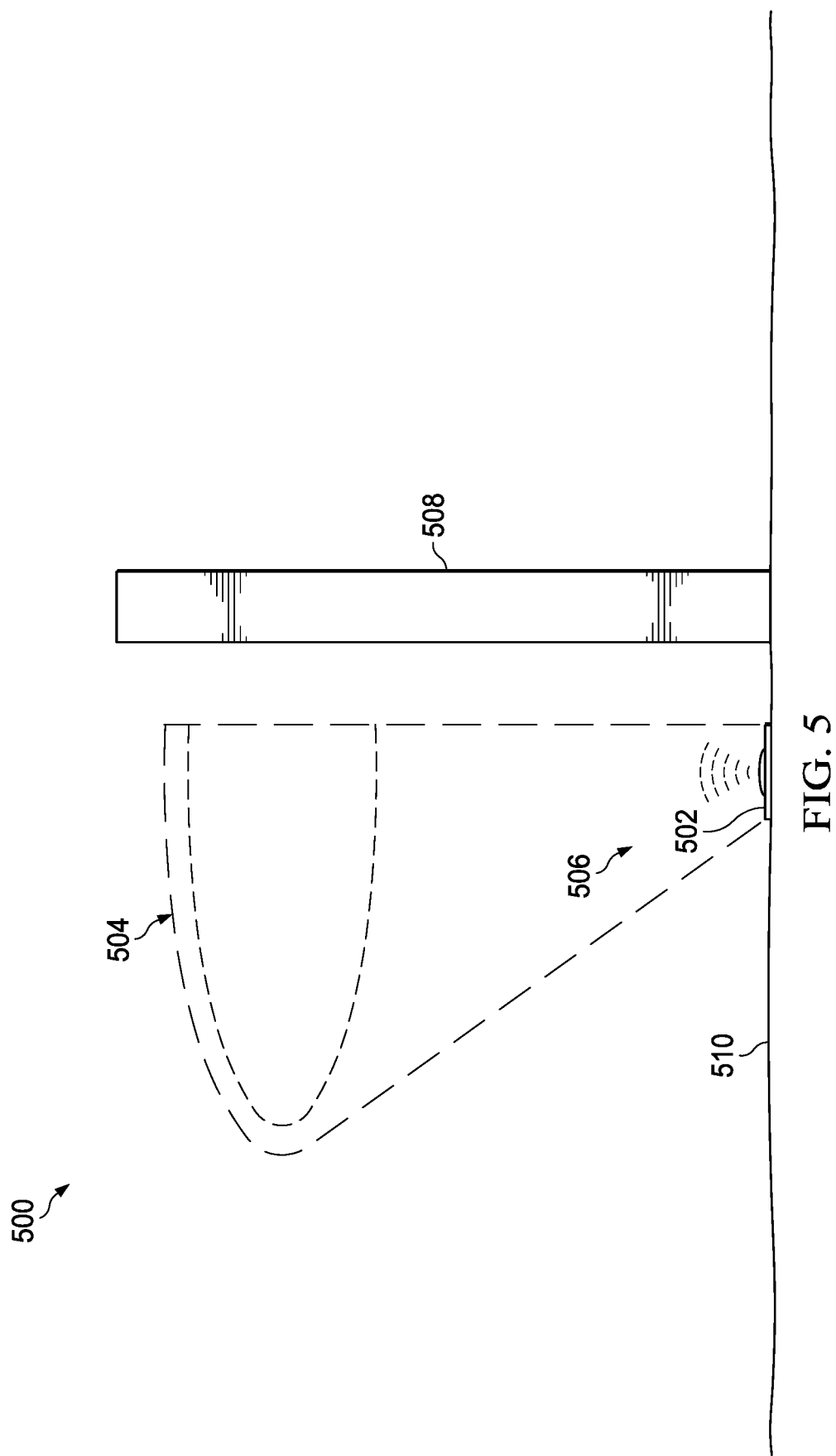
FIG. 5 is an illustration of an environment in which an approach funnel of a portable unmanned aerial vehicle approach and departure zone protection platform is modified based on a presence of an object in accordance with an illustrative embodiment.

Turning now to FIG. 5, an illustration of an environment in which an approach funnel of a portable unmanned aerial vehicle approach and departure zone protection platform is modified based on a presence of an object is depicted in accordance with an illustrative embodiment. Environment 500 is a physical implementation of environment 100 of FIG. 1.

Portable unmanned aerial vehicle approach and departure zone protection platform 502 is present in environment 500. Portable unmanned aerial vehicle approach and departure zone protection platform 502 is a physical implementation of portable unmanned aerial vehicle approach and departure zone protection platform 106 of FIG. 1.

Portable unmanned aerial vehicle approach and departure zone protection platform 502 protects approach funnel 504. More specifically, portable unmanned aerial vehicle approach and departure zone protection platform 502 protects at least one of objects (not depicted) within approach funnel 504 or an unmanned aerial vehicle (not depicted) that will ascend or descend using approach funnel 504. As depicted, no objects are present in approach funnel 504. However, moveable objects such as people, animals, vehicles, toys, or other moveable objects may enter approach funnel 504 at a later time. Portable unmanned aerial vehicle approach and departure zone protection platform 502 protects an unmanned aerial vehicle (not depicted) from contacting objects during ascent or descent.

In this illustrative example, an operator (not depicted) has placed portable unmanned aerial vehicle approach and departure zone protection platform 502 within environment 500. As depicted, placement 506 of portable unmanned aerial vehicle approach and departure zone protection platform 502 is near wall 508.

As depicted, placement 506 of portable unmanned aerial vehicle approach and departure zone protection platform 502 is on ground 510. By positioning portable unmanned aerial vehicle approach and departure zone protection platform 502 near wall 508, approach funnel 504 is asymmetrical.

In some illustrative examples, a processor of portable unmanned aerial vehicle approach and departure zone protection platform 502 adjusts the shape of approach funnel 504 based on proximity of wall 508. In some illustrative examples, a processor of portable unmanned aerial vehicle approach and departure zone protection platform 502 adjusts a dimension of approach funnel 504 based on the proximity of wall 508. By positioning portable unmanned aerial vehicle approach and departure zone protection platform 502 near wall 508, approach funnel 504 has at least one of a different size or a different shape from an approach funnel if portable unmanned aerial vehicle approach and departure zone protection platform 502 was in an open field.

If placement 506 of portable unmanned aerial vehicle approach and departure zone protection platform 502 is undesirable, portable unmanned aerial vehicle approach and departure zone protection platform 502 may be repositioned by an operator (not depicted). In some illustrative examples, a display on portable unmanned aerial vehicle approach and departure zone protection platform 502 provides feedback regarding placement 506 of portable unmanned aerial vehicle approach and departure zone protection platform 502 in environment 500. In some illustrative examples, the display provides information regarding a size, a shape, or any other characteristics of approach funnel 504.

Figure 6:
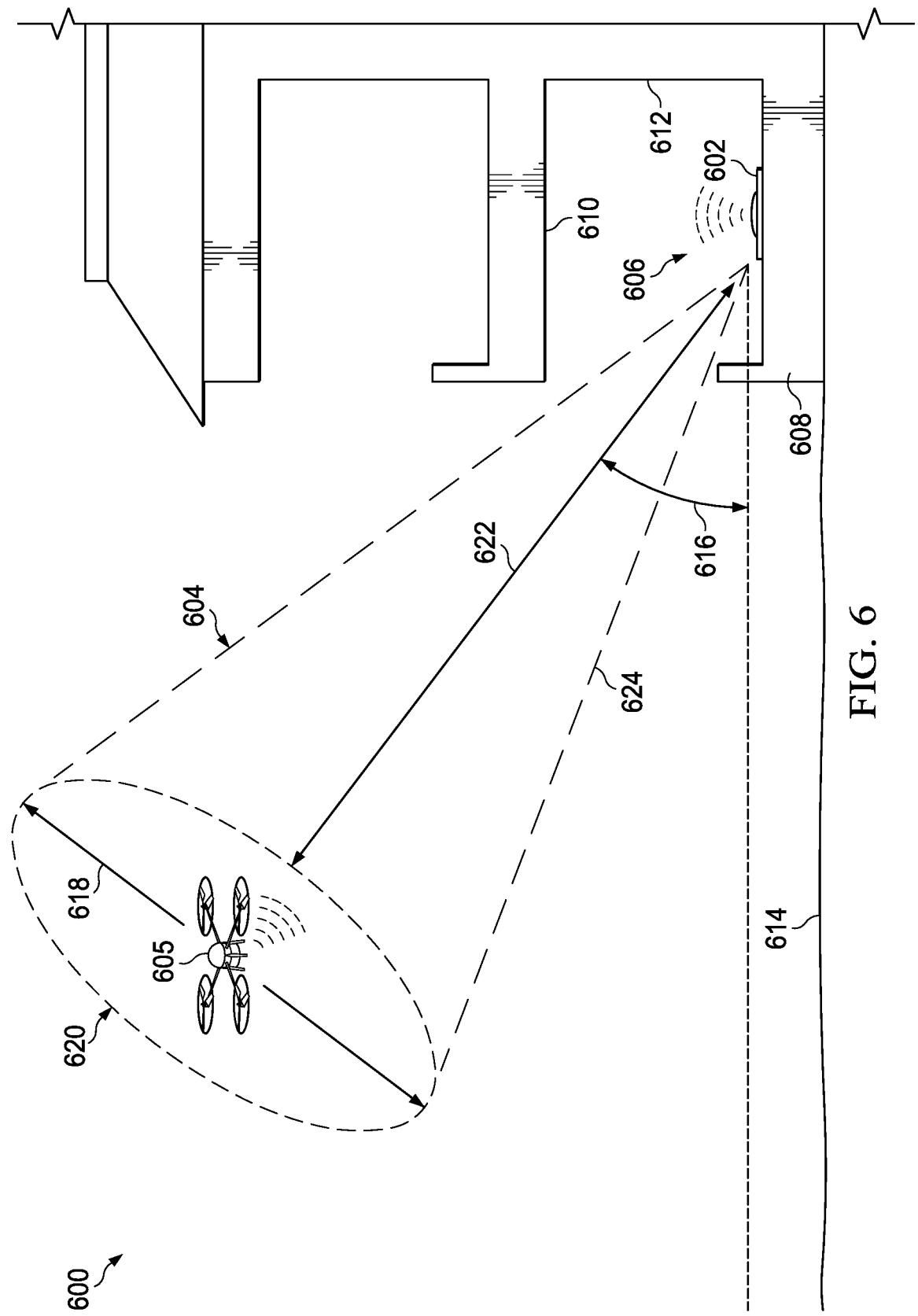
FIG. 6 is an illustration of an environment in which an angle of an approach funnel of a portable unmanned aerial vehicle approach and departure zone protection platform is modified based on surrounding structures in accordance with an illustrative embodiment.

Turning now to FIG. 6, an illustration of an environment in which an angle of an approach funnel of a portable unmanned aerial vehicle approach and departure zone protection platform is modified based on surrounding structures is depicted in accordance with an illustrative embodiment. Environment 600 is a physical implementation of environment 100 of FIG. 1.

Portable unmanned aerial vehicle approach and departure zone protection platform 602 is present in environment 600. Portable unmanned aerial vehicle approach and departure zone protection platform 602 is a physical implementation of portable unmanned aerial vehicle approach and departure zone protection platform 106 of FIG. 1.

Portable unmanned aerial vehicle approach and departure zone protection platform 602 protects approach funnel 604. More specifically, portable unmanned aerial vehicle approach and departure zone protection platform 602 protects at least one of objects (not depicted) within approach funnel 604 or an unmanned aerial vehicle, such as unmanned aerial vehicle 605, that will ascend or descend using approach funnel 604. As depicted, no objects are present in approach funnel 604. However, moveable objects such as people, animals, vehicles, toys, or other moveable objects may enter approach funnel 604 at a later time. Portable unmanned aerial vehicle approach and departure zone protection platform 602 protects unmanned aerial vehicle 605 from contacting objects during ascent or descent.

In this illustrative example, an operator (not depicted) has placed portable unmanned aerial vehicle approach and departure zone protection platform 602 within environment 600. As depicted, placement 606 of portable unmanned aerial vehicle approach and departure zone protection platform 602 is on balcony 608. Balcony 608 is covered by balcony 610 and has wall 612. By positioning portable unmanned aerial vehicle approach and departure zone protection platform 602 on balcony 608, approach funnel 604 is angled relative to ground 614. The size and shape of approach funnel 604 is affected by positioning portable unmanned aerial vehicle approach and departure zone protection platform 602 on balcony 608.

By positioning portable unmanned aerial vehicle approach and departure zone protection platform 602 on balcony 608, approach funnel 604 includes a portion of balcony 608. As depicted, angle 616 of approach funnel 604 is approximately 45 degrees relative to ground 614. Depending on at least one of the type of unmanned aerial vehicle to use approach funnel 604, or placement 606 of portable unmanned aerial vehicle approach and departure zone protection platform 602, angle 616 may be changed. For example, angle 616 of approach funnel 604 for rotary unmanned aerial vehicles may have a different angle than angle 616. As depicted, width 618 is sufficient such that unmanned aerial vehicle 605 may ascend and descend within approach funnel 604 with angle 616.

As depicted, approach funnel 604 is conical 620. As approach funnel 604 is conical 620, width 618 may instead be referred to as a diameter. Width 618 and height 622 of approach funnel 604 create slope 624 of approach funnel 604.

Dimensions for approach funnel 604 include width 618, height 622, and slope 624. At least one of angle 616, width 618, height 622, or slope 624 may be changed based on placement 606. At least one of angle 616, width 618, height 622, or slope 624 may be changed based on distances of objects (not depicted) from portable unmanned aerial vehicle approach and departure zone protection platform 602. At least one of angle 616, width 618, height 622, or slope 624 may be changed if an object is determined to be within approach funnel 604. For example, width 618 may be changed if an object is determined to be on a periphery of approach funnel 604. As another example, angle 616 may be changed to remove a stationary object from approach funnel 604. As yet another example, a shape of approach funnel 604 may be changed to remove a potentially mobile object from approach funnel 604. For example, approach funnel 604 may be changed such that approach funnel 604 is not conical 620.

In some illustrative examples, distances of objects detected by a sensor of portable unmanned aerial vehicle approach and departure zone protection platform 602 are used to dynamically create and adjust approach funnel 604. For example, distances of objects detected by a sensor of portable unmanned aerial vehicle approach and departure zone protection platform 602 may be used to dynamically create and adjust approach funnel 604 to fit the confines of the surrounding space. In some illustrative examples, portable unmanned aerial vehicle approach and departure zone protection platform 602 leaves a preset or user determined buffer between the boundaries of approach funnel 604 and the surrounding structures such as balcony 610 and wall 612.

The illustration of environment 600 in FIG. 6 is not meant to imply physical or architectural limitations to the manner in which an illustrative embodiment may be implemented. As noted, approach funnel 604 may have any desirable angle, any desirable dimensions, and any desirable shape. Additionally, any types of objects, stationary or mobile, may be present in environment 600.

Figure 7:
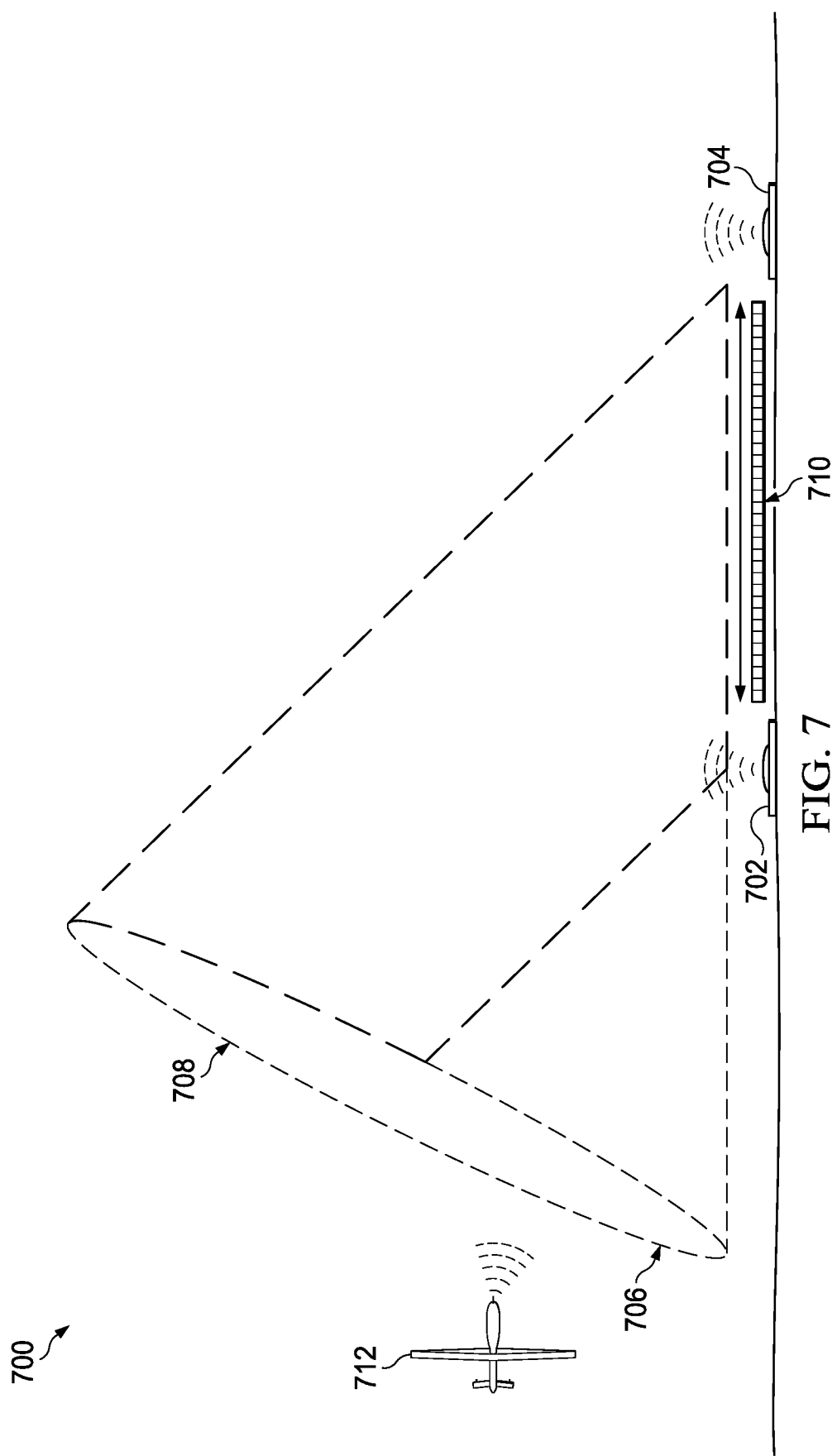
FIG. 7 is an illustration of an environment in which an approach funnel is formed by two portable unmanned aerial vehicle approach and departure zone protection platforms working in conjunction in accordance with an illustrative embodiment.

Turning now to FIG. 7, an illustration of an environment in which an approach funnel is formed by two portable unmanned aerial vehicle approach and departure zone protection platforms working in conjunction is depicted in accordance with an illustrative embodiment. Environment 700 is a physical implementation of environment 100 of FIG. 1.

Portable unmanned aerial vehicle approach and departure zone protection platform 702 and portable unmanned aerial vehicle approach and departure zone protection platform 704 are present in environment 700. Portable unmanned aerial vehicle approach and departure zone protection platform 702 approach funnel 706. Portable unmanned aerial vehicle approach and departure zone protection platform 704 has approach funnel 708. Employing multiple portable unmanned aerial vehicle approach and departure zone protection platforms may create a larger landing pad than a single portable unmanned aerial vehicle approach and departure zone protection platform.

In this illustrative example, landing pad 710 is positioned between portable unmanned aerial vehicle approach and departure zone protection platform 702 and portable unmanned aerial vehicle approach and departure zone protection platform 704. Active monitoring sensors of both portable unmanned aerial vehicle approach and departure zone protection platform 702 and portable unmanned aerial vehicle approach and departure zone protection platform 704 monitor and protect landing pad 710. Portable unmanned aerial vehicle approach and departure zone protection platform 702 and portable unmanned aerial vehicle approach and departure zone protection platform 704 may communicate sensor data to each other.

Using multiple portable unmanned aerial vehicle approach and departure zone protection platforms may be especially beneficial to fixed wing unmanned aerial vehicles, such as unmanned aerial vehicle 712. Unmanned aerial vehicle 712 may receive instructions from at least one of portable unmanned aerial vehicle approach and departure zone protection platform 702 or portable unmanned aerial vehicle approach and departure zone protection platform 704.

The different components shown in FIGS. 2-7 may be combined with components in FIG. 1, used with components in FIG. 1, or a combination of the two. Additionally, some of the components in FIGS. 2-7 may be illustrative examples of how components shown in block form in FIG. 1 can be implemented as physical structures.

Figure 8:
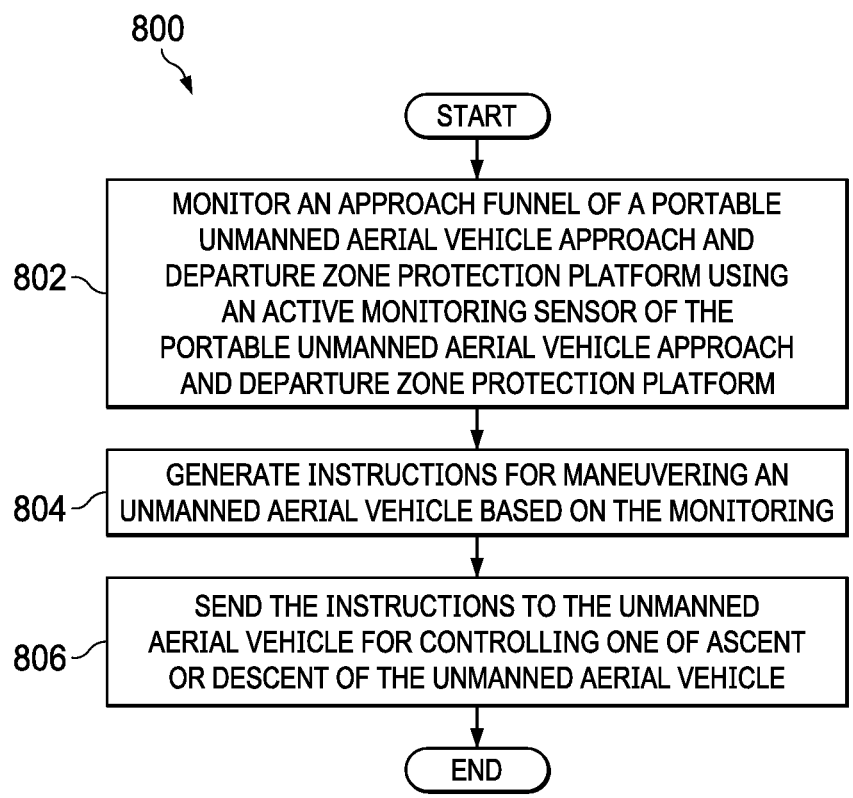
FIG. 8 is an illustration of a flowchart of a method for directing an unmanned aerial vehicle in accordance with an illustrative embodiment.

Turning now to FIG. 8, an illustration of a flowchart of a method for directing an unmanned aerial vehicle is depicted in accordance with an illustrative embodiment. Method 800 may be implemented in environment 100 using portable unmanned aerial vehicle approach and departure zone protection platform 106 of FIG. 1. Method 800 may be implemented in environment 200 using portable unmanned aerial vehicle approach and departure zone protection platform 202 of FIG. 2. Method 800 may be implemented in environment 500 using portable unmanned aerial vehicle approach and departure zone protection platform 502 of FIG. 5.

Method 800 monitors an approach funnel of a portable unmanned aerial vehicle approach and departure zone protection platform using an active monitoring sensor of the portable unmanned aerial vehicle approach and departure zone protection platform (operation 802). Method 800 generates instructions for maneuvering an unmanned aerial vehicle based on the monitoring (operation 804). Method 800 sends the instructions to the unmanned aerial vehicle for controlling one of ascent or descent of the unmanned aerial vehicle (operation 806). Afterwards, the method terminates.

Figure 9A:
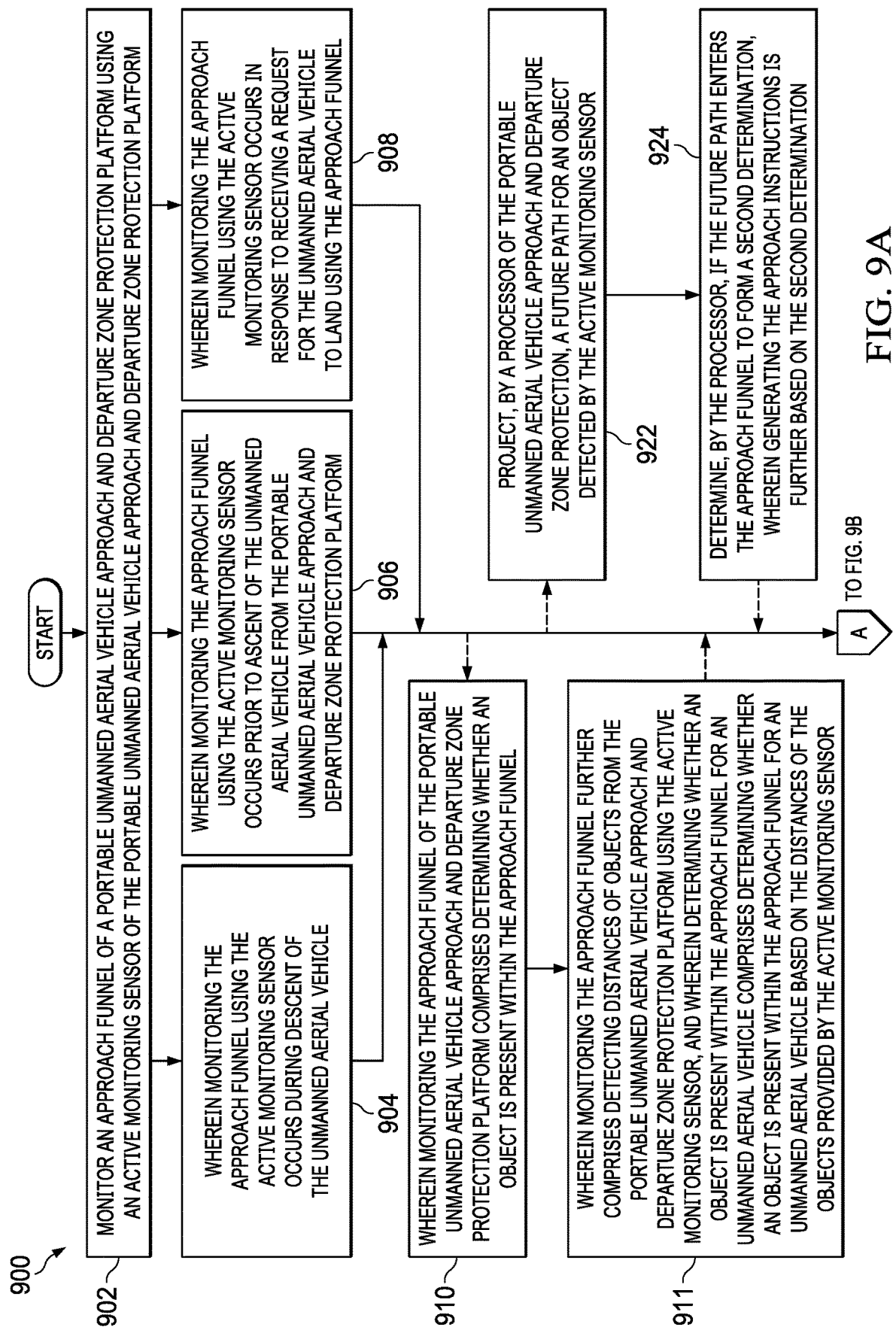
FIGS. 9A and 9B are an illustration of a flowchart of a method for directing an unmanned aerial vehicle in accordance with an illustrative embodiment.
Figure 9B:
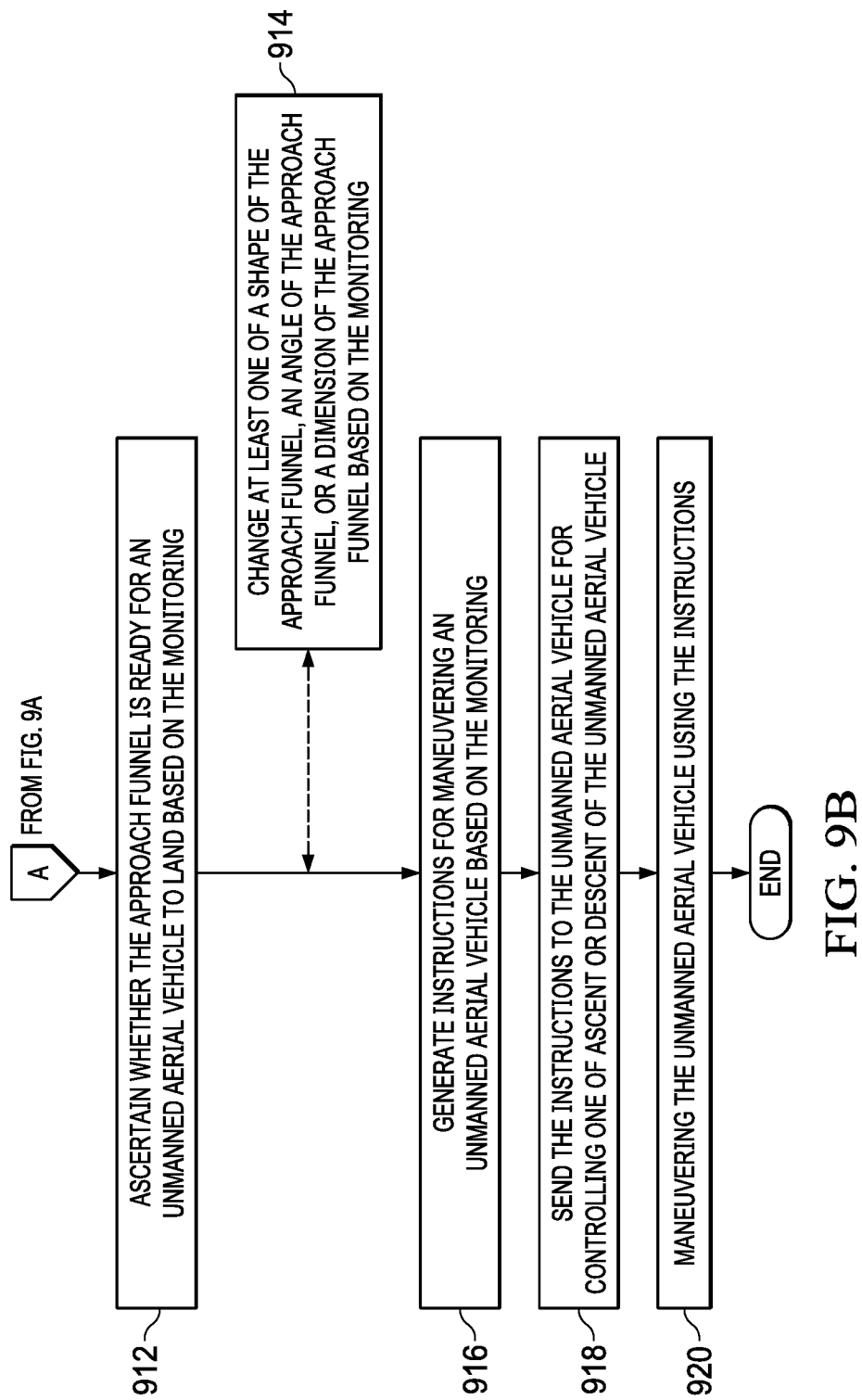

Turning now to FIGS. 9A and 9B, an illustration of a flowchart of a method for directing an unmanned aerial vehicle is depicted in accordance with an illustrative embodiment. Method 900 may be implemented in environment 100 using portable unmanned aerial vehicle approach and departure zone protection platform 106 of FIG. 1. Method 900 may be implemented in environment 200 using portable unmanned aerial vehicle approach and departure zone protection platform 202 of FIG. 2. Method 900 may be implemented in environment 500 using portable unmanned aerial vehicle approach and departure zone protection platform 502 of FIG. 5.

Method 900 monitors an approach funnel of a portable unmanned aerial vehicle approach and departure zone protection platform using an active monitoring sensor of the portable unmanned aerial vehicle approach and departure zone protection platform (operation 902). In some illustrative examples, monitoring using an active monitoring sensor occurs during descent of the unmanned aerial vehicle (operation 904).

In some illustrative examples, monitoring using an active monitoring sensor occurs prior to ascent of the unmanned aerial vehicle from the portable unmanned aerial vehicle approach and departure zone protection platform (operation 906). In some illustrative examples, monitoring using an active monitoring sensor occurs in response to receiving a request for the unmanned aerial vehicle to land using the approach funnel (operation 908).

In some illustrative examples, monitoring the approach funnel of a portable unmanned aerial vehicle approach and departure zone protection platform comprises determining whether an object is present within the approach funnel (operation 910). In some illustrative examples, monitoring the approach funnel further comprises detecting distances of objects from a portable unmanned aerial vehicle approach and departure zone protection platform using the active monitoring sensor, and determining whether an object is present within an approach funnel for an unmanned aerial vehicle comprises determining whether an object is present within an approach funnel for an unmanned aerial vehicle based on the distances of the objects provided by the active monitoring sensor (operation 911). In some illustrative examples, determining whether an object is present within an approach funnel for an unmanned aerial vehicle is performed by a processor connected to the base.

Detection of distances of objects from the portable unmanned aerial vehicle approach and departure zone protection platform may take place at any desirable time or in response to any desirable incident. In some illustrative examples, detecting distances of objects from the portable unmanned aerial vehicle approach and departure zone protection platform takes place continuously. When distances of objects from the portable unmanned aerial vehicle approach and departure zone protection platform are detected continuously, time periods between detection measurements may have any desirable length. For example, when detecting distances of objects from the portable unmanned aerial vehicle approach and departure zone protection platform takes place continuously, detection measurements may be taken every 5 seconds, every 20 seconds, or any other desirable length of time.

In some illustrative examples, the active monitoring sensor that detects distances of objects from the portable unmanned aerial vehicle approach and departure zone protection platform is connected to a base of the portable unmanned aerial vehicle approach and departure zone protection platform. The objects may take any desirable form. The objects may be any desirable quantity of objects. In some illustrative examples, the active monitoring sensor may detect distance of objects within a set perimeter of the portable unmanned aerial vehicle approach and departure zone protection platform.

In some illustrative examples, method 900 ascertains whether the approach funnel is ready for an unmanned aerial vehicle to land based on the monitoring (operation 912). In some illustrative examples, method 900 changes at least one of a shape of the approach funnel, an angle of the approach funnel, or a dimension of the approach funnel based on the monitoring (operation 914).

Method 900 generates instructions for maneuvering an unmanned aerial vehicle based on the monitoring (operation 916). In some illustrative examples, the instructions are approach instructions, and the approach instructions include one of a ready signal or a not-ready signal.

Method 900 sends the instructions to the unmanned aerial vehicle for controlling one of ascent or descent of the unmanned aerial vehicle (operation 918). In some illustrative examples, method 900 maneuvers the unmanned aerial vehicle using the instructions (operation 920). Afterwards, the method terminates.

In some illustrative examples, method 900 optionally projects, by the processor, a future path for an object detected by the active monitoring sensor (operation 922). In some illustrative examples, method 900 determines, by the processor, if the future path enters the approach funnel to form a second determination, wherein generating the instructions is further based on the second determination (operation 924).

Figure 10:
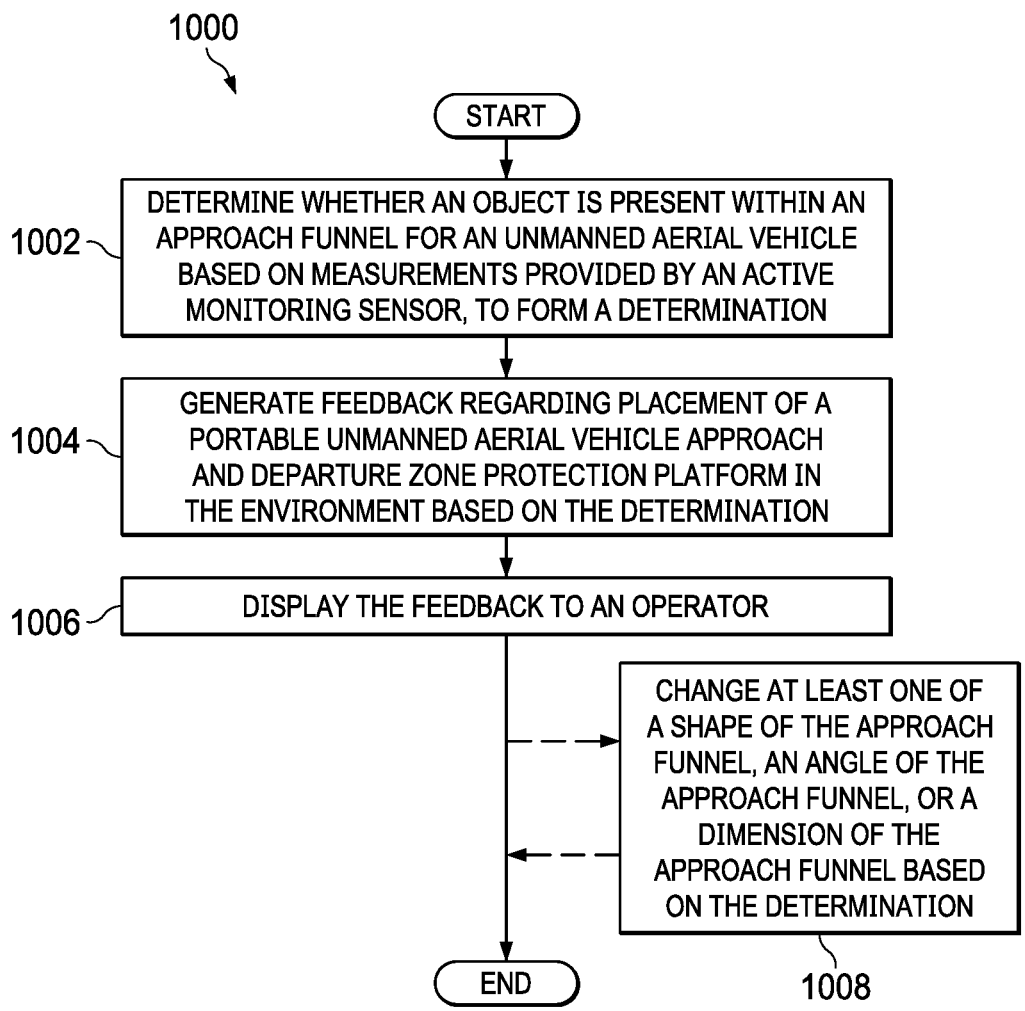
FIG. 10 is an illustration of a flowchart of a method for setting up a portable unmanned aerial vehicle approach and departure zone protection platform in accordance with an illustrative embodiment.

Turning now to FIG. 10, an illustration of a flowchart of a method for setting up a portable unmanned aerial vehicle approach and departure zone protection platform is depicted in accordance with an illustrative embodiment. Method 1000 may be implemented in environment 100 using portable unmanned aerial vehicle approach and departure zone protection platform 106 of FIG. 1. Method 1000 may be implemented in environment 200 using portable unmanned aerial vehicle approach and departure zone protection platform 202 of FIG. 2. Method 1000 may be implemented in environment 500 using portable unmanned aerial vehicle approach and departure zone protection platform 502 of FIG. 5.

Method 1000 determines whether an object is present within an approach funnel for an unmanned aerial vehicle based on measurements provided by an active monitoring sensor, to form a determination (operation 1002). Method 1000 generates feedback regarding placement of a portable unmanned aerial vehicle approach and departure zone protection platform in the environment based on the determination (operation 1004).

Method 1000 displays the feedback to an operator (operation 1006). Afterwards, the method terminates. In some illustrative examples, method 1000 optionally changes at least one of a shape of the approach funnel, an angle of the approach funnel, or a dimension of the approach funnel based on the determination (operation 1008).

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 900 is performed. For example, operation 922 and operation 924 are optional. As another example, operation 904, operation 906, and operation 908 may all occur. As another example, only one of operation 904, operation 906, or operation 908 may occur.

The illustrative examples present a portable unmanned aerial vehicle approach and departure zone protection platform. In some illustrative examples, the portable unmanned aerial vehicle approach and departure zone protection platform may also be referred to as a "Droneport." The Droneport includes a base that may take the form of a platform or a "mat" that contains active sensors that detect and create a UAV-safe approach/departure "funnel" over the landing area. The Droneport is fitted with active sensors, such as LIDAR or radar and GPS sensors, and sends a ready and "clear to land" signal and authorization code to the UAS. The UAS also sends an authorization to the Droneport. In some illustrative examples, the Droneport also includes a weather sensor and sends weather data (WX) such as wind, precipitation, temperature, etc. The active sensor automatically detects obstacles penetrating the funnel in real-time. The obstacles may take any form, such as trees, structures, as well as transient penetrations such as animals, humans, etc. that may enter the safe zone funnel.

This Droneport provides auto detection of obstacles, protection, and communication to UAS of fly safe approach/departure areas for UAS operations. The Droneport may also provide auto detection of weather.

The Droneport platform active sensor automatically senses surrounding obstacles that may interfere with landing and creates an active approach/departure safe "funnel" over the landing area. The Droneport broadcasts a "clear to land" signal to the UAV. In some illustrative examples, the Droneport also broadcasts weather information to the UAV.

If people, animals, or debris stray into an active funnel, a "not-ready"-"go-around" signal is transmitted to the UAS. The Droneport has GPS sensors and broadcasts position where the funnel is centered.

The UAV also broadcasts an authorization code to the Droneport. UAS can enter the funnel and land only if they receive a clear to land and authorization code.

The funnel dimensions can be adjusted based on the location of the Droneport and operator inputs. The funnel dimensions are communicated to the UAS. The Droneport platform provides directions to the user (via LCD or other desirable display) for placing it in an area with max clearance from surrounding obstacles.

The Droneport can be connected to Internet for UTM (UAV Traffic Management), weather (WX) reports, communication to delivery companies, etc. The Droneport can be fitted with a solar cell for battery re-charge.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system, comprising:
a portable unmanned aerial vehicle approach and departure zone protection platform having:
a base;
an active monitoring sensor connected to the base;
a processor connected to the active monitoring sensor; and
a communication device connected to the processor;
wherein:
the processor of the portable unmanned aerial vehicle approach and departure zone protection platform is configured to:
determine, in response to periodic input from the active monitoring sensor, whether an object is within a predetermined distance from the base and whether an object is present in an approach funnel of an approach and departure zone; and
generate maneuvering instructions, wherein the maneuvering instructions are for maneuvering an unmanned aerial vehicle in the approach funnel;
the unmanned aerial vehicle is different than the portable unmanned aerial vehicle approach and departure zone protection platform;
the portable unmanned aerial vehicle approach and departure zone protection platform is configured to send the maneuvering instructions to the unmanned aerial vehicle;
the portable unmanned aerial vehicle approach and departure zone protection platform is disposed at a fixed location relative to and apart from the unmanned aerial vehicle; and
the unmanned aerial vehicle is configured to use the maneuvering instructions as received from the portable unmanned aerial vehicle approach and departure zone protection platform to maneuver.

2. The system of claim 1, wherein the active monitoring sensor is configured to detect distances of objects from the base.

3. The system of claim 1, wherein the approach funnel includes portions of ground.

4. The system of claim 1, wherein the active monitoring sensor is at least one of LIDAR, RADAR, or SONAR.

5. The system of claim 1, further comprising:
a display configured to provide feedback to an operator regarding placement of the base in an environment.

6. The system of claim 1, further comprising:
a rechargeable battery; and
a solar cell.

7. The system of claim 1, wherein the processor is configured to determine whether an object is present within the approach funnel for an unmanned aerial vehicle based on distances of objects provided by the active monitoring sensor to form a first determination.

8. The system of claim 7, wherein the maneuvering instructions are for controlling one of ascent or descent of the unmanned aerial vehicle based on a second determination of whether an object is present within the approach funnel.

9. The system of claim 7, wherein the maneuvering instructions are approach instructions, wherein the approach instructions include a not-ready signal or a ready signal, and wherein a not-ready signal is sent when an object is present within the approach funnel.

10. The system of claim 9, wherein the approach instructions further include a location, a size, and a shape for the approach funnel.

11. The system of claim 7, wherein the processor is further configured to change at least one of a shape of the approach funnel, an angle of the approach funnel, or a dimension of the approach funnel based on the first determination.

12. The system of claim 7, further comprising:
a weather sensor, wherein the maneuvering instructions include weather information gathered from the weather sensor.

13. The system of claim 7, further comprising:
a weather sensor, wherein the maneuvering instructions include an approach direction based on weather information gathered from the weather sensor.

14. The system of claim 7, wherein the maneuvering instructions include an approach direction based on distances of objects detected by the active monitoring sensor from the base.

15. The system of claim 1, further comprising:
a GPS receiver.

16. A method comprising:
monitoring an approach funnel of a portable unmanned aerial vehicle approach and departure zone protection platform using an active monitoring sensor of the portable unmanned aerial vehicle approach and departure zone protection platform;
determining, in response to periodic input from the active monitoring sensor, whether an object is within a predetermined distance from the base and whether an object is present in an approach funnel of an approach and departure zone;
generating maneuvering instructions, by a processor of the portable unmanned aerial vehicle approach and departure zone protection platform, for maneuvering an unmanned aerial vehicle based on said monitoring, wherein the unmanned aerial vehicle is different than the portable unmanned aerial vehicle approach and departure zone protection platform;
sending, by a communication device of the portable unmanned aerial vehicle approach and departure protection platform, the maneuvering instructions to the unmanned aerial vehicle for controlling one of ascent or descent of the unmanned aerial vehicle and for controlling the unmanned aerial vehicle to avoid any object determined to be present in the approach funnel and any object determined to be within the predetermined distance from the base; and
the unmanned aerial vehicle maneuvering using the maneuvering instructions as received from the portable unmanned aerial vehicle approach and departure zone protection platform.

17. The method of claim 16, wherein said monitoring comprises determining whether an object is present within the approach funnel.

18. The method of claim 17, wherein said monitoring the approach funnel further comprises detecting distances of objects from the portable unmanned aerial vehicle approach and departure zone protection platform using the active monitoring sensor, and wherein said determining whether an object is present within the approach funnel for an unmanned aerial vehicle comprises determining whether an object is present within the approach funnel for an unmanned aerial vehicle based on the distances of objects provided by the active monitoring sensor.

19. The method of claim 18, wherein said determining whether an object is present within an approach funnel for an unmanned aerial vehicle is performed by the processor, and wherein the processor is connected to a base of the portable unmanned aerial vehicle approach and departure zone protection platform.

20. The method of claim 16, wherein the communication device is connected to a base of the portable unmanned aerial vehicle approach and departure zone protection platform.

21. The method of claim 16, wherein said monitoring the approach funnel using the active monitoring sensor occurs during descent of the unmanned aerial vehicle.

22. The method of claim 16, wherein said monitoring the approach funnel using the active monitoring sensor occurs prior to ascent of the unmanned aerial vehicle from the portable unmanned aerial vehicle approach and departure zone protection platform.

23. The method of claim 16, wherein said monitoring the approach funnel using the active monitoring sensor occurs in response to receiving a request for the unmanned aerial vehicle to land.

24. The method of claim 16, wherein the maneuvering instructions are approach instructions, and wherein the approach instructions include one of a ready signal or a not-ready signal.

25. The method of claim 16, further comprising:
determining, based on the monitoring, whether the approach funnel is ready for an unmanned aerial vehicle to land.

26. The method of claim 16, further comprising:
maneuvering the unmanned aerial vehicle using the maneuvering instructions.

27. The method of claim 16, further comprising:
changing at least one of a shape of the approach funnel, an angle of the approach funnel, or a dimension of the approach funnel based on the monitoring.

28. The method of claim 16, further comprising:
projecting, by the processor, a future path for an object detected by the active monitoring sensor; and
determining, by the processor, if the future path enters the approach funnel to form a second determination, wherein said generating the maneuvering instructions is further based on the second determination.

29. A method comprising:
determining whether an object is present within an approach funnel for an unmanned aerial vehicle based on periodic measurements provided by an active monitoring sensor;
determining, based on periodic measurements provided by an active monitoring sensor, whether an object is within a predetermined distance from the base;
generating feedback regarding placement of a portable unmanned aerial vehicle approach and departure zone protection platform in an environment based on said determining, wherein the feedback is regarding at least one of:
the placement relative to objects in the environment; or
a dimension or a shape of the approach funnel based on the placement in the environment; and
displaying the feedback to an operator;
wherein:
the portable unmanned aerial vehicle approach and departure zone protection platform is different than the unmanned aerial vehicle; and
the unmanned aerial vehicle uses maneuvering instructions as received from the portable unmanned aerial vehicle approach and departure zone protection platform for maneuvering the unmanned aerial vehicle, wherein the maneuvering instructions include instructions for the unmanned aerial vehicle to avoid any object determined to be in the approach funnel and avoid any object determined to be within the predetermined distance from the base.

30. The method of claim 29, further comprising:
changing at least one of the shape of the approach funnel, an angle of the approach funnel, or the dimension of the approach funnel based on said determining.

* * * * *